United States Patent
Maruyama

(10) Patent No.: US 6,721,071 B1
(45) Date of Patent: Apr. 13, 2004

(54) FACSIMILE ALLOWING CORRECT REGISTRATION OF TELEPHONE NUMBER

(75) Inventor: Tomoko Maruyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/110,619

(22) Filed: Jul. 6, 1998

(30) Foreign Application Priority Data

Jul. 9, 1997 (JP) ............................................. 9-183508
Sep. 11, 1997 (JP) ............................................. 9-246717

(51) Int. Cl.$^7$ ............................................. H04N 1/00
(52) U.S. Cl. ..................................... 358/440; 358/400
(58) Field of Search .................................. 358/440, 400, 358/403, 404; 379/100, 100.01, 100.02–100.09

(56) References Cited

U.S. PATENT DOCUMENTS

| | | | | |
|---|---|---|---|---|
| 5,168,376 A | * | 12/1992 | Motohama | 358/437 |
| 5,216,705 A | * | 6/1993 | Yoshida et al. | 358/440 |
| 5,216,706 A | * | 6/1993 | Nakajima | 379/100 |
| 5,396,342 A | * | 3/1995 | Meyer | 358/406 |
| 5,406,387 A | * | 4/1995 | Yamamoto | 358/407 |
| 5,511,109 A | * | 4/1996 | Hartley et al. | 379/40 |
| 5,673,373 A | * | 9/1997 | Nosaki et al. | 395/114 |
| 5,720,014 A | * | 2/1998 | Ikeda et al. | 395/114 |
| 5,732,126 A | * | 3/1998 | Fitzpatrick et al. | 379/67 |
| 5,805,679 A | * | 9/1998 | Kuwabara | 379/100.15 |
| 5,889,845 A | * | 3/1999 | Staples et al. | 279/211 |
| 5,936,744 A | * | 8/1999 | Choi | 358/440 |
| 6,014,228 A | * | 1/2000 | Castro | 358/400 |
| 6,072,599 A | * | 6/2000 | Oba et al. | 358/444 |

* cited by examiner

Primary Examiner—Thomas D. Lee
(74) Attorney, Agent, or Firm—Sidley Austin Brown & Wood LLP

(57) ABSTRACT

The facsimile forms an image based on an image data received through a communication and allows registration of a telephone number specifying a calling device. In the facsimile, the telephone number of the calling device is detected at the time of calling and is referenced to a registered telephone number. If the telephone number of the calling device is registered for reception rejection, the received image data will be discarded, an error signal indicating the reception rejection will be transmitted, or the telephone circuit will not be connected.

5 Claims, 14 Drawing Sheets

F I G. 7

| NUMBER | DATE | TIME | RECEPTION/TRANSMISSION | PARTNER | TSI ? | RESULT OF COMMUNICATION |
|---|---|---|---|---|---|---|
| 1 | 12/10 | 15:30 | RX | 03-3333-2222 | NO | OK |
| 2 | 12/10 | 15:20 | RX | 8165556666 | YES | OK |
| 3 | 12/10 | 14:55 | TX | OT-13 ABC Co.,Ltd. | NO | OK |
| 4 | 12/10 | 14:45 | TX | 0311114444 | NO | NG |
| 5 | 12/10 | 13:30 | RX | (UNIDENTIFIED) | NO | OK |
| ... | ... | ... | ... | ... | ... | ... |

FIG. 11

| DIAL REGISTRATION SETTING | |
|---|---|
| REGISTRATION TO COMMUNICATION RECORD | ALLOWED / NOT ALLOWED |
| DIAL REGISTRATION | ALLOWED / NOT ALLOWED |
| PERMITTED NUMBER OF TRANSMISSION DIRECTION | 2 |
| SETTING COMPLETED=Yes / NEXT SETTING=↓ | |

FACSIMILE ALLOWING CORRECT REGISTRATION OF TELEPHONE NUMBER

This application is based on applications Nos. 9-183508 and 9-246717 filed in Japan, the contents of which are hereby incorporated by reference.

BACKGROUND OF THE INVENTION

1. Field of the Invention

The present invention relates to a facsimile device, and more particularly to a facsimile having a function of storing a result of transmission and reception of data as a communication management record.

2. Description of the Related Art

First Example of the Related Art

Conventionally, a facsimile device managing (storing and utilizing) a record of communication of transmission and reception of data has been known. In such a facsimile device, if a TSI (Transmitting Station Identification) signal is received from a transmitting facsimile at the time of reception, the receiving device can specify the transmitting device by keeping the information included in the signal. If the TSI signal is a telephone number of the transmitting facsimile, the telephone number of the transmitting facsimile can be stored and utilized.

Second Example of the Related Art

Further, a facsimile having a one-touch dialing function or an abbreviated (speed) dialing function has been known. The one-touch dialing function refers to a function in which a previously registered telephone number can be input through one key to perform a facsimile transmission.

The abbreviated dialing function refers to a function in which a train of numbers, a two-digit number, for example, and the corresponding telephone number are previously registered in a facsimile and the registered telephone number can be dialed by pressing an abbreviated dialing key (speed dialing key) and inputting the registered train of numbers from ten keys. As the main function of the one-touch dialing is the abbreviation of a telephone number, in a broad sense, the one-touch dialing function is included in the abbreviated dialing function.

Third Example of the Related Art

Conventionally, a facsimile capable of limiting its communication partners has been used in order to prevent an unwanted junk FAX and an unsolicited sales FAX. In such a facsimile, a telephone number or a password of a transmitting device is previously registered in a receiving device. When a facsimile sends a request to receive, the line is connected to identify the calling device by the telephone number of the calling device or the caller designated password. If the calling device is identified as an admitted device, image data is received and printing starts, otherwise, the receiving device disconnects the circuit without receiving the image data.

In addition, NTT (Nippon Telegraph And Telephone Corporation) has recently started a new service (called "number display service") to notify the called of the telephone number of the calling device. The purpose of the service is also the prevention of an unwanted telephone call and an unsolicited sales telephone call.

The above described conventional art, however, have suffered from following problems.

Problem in the First Example

A TSI signal is not always transmitted and may not be an actual telephone number. In such a case, the telephone number of the transmitting facsimile can not be managed. It is inconvenient because not all of the calls can be answered by the device.

Problem in the Second Example

A telephone number frequently used only for a few days or a few hours would not be registered as a one-touch dialing number or an abbreviated dialing number. Most of the time, such a number is directly input from ten keys, which is troublesome and prone to mistakes in input.

Additionally, a facsimile device having a redialing function has been known, which allows inputting the last dialed number through one key input, to solve the problem mentioned above. The stored telephone number is, however, not always a correct number. In addition, when a facsimile is shared among a plurality of person, the last input number is hard to specify. Thus the redialing function is seldom used.

Problem in the Third Example

In order to utilize the above described type of facsimile in which a telephone number of a transmitting device is used, it is necessary for the transmitting side (caller) to register the telephone number of itself in advance, and for the receiving side (called) to check the telephone number of the caller in advance. If a facsimile employing a password is to be used, the receiving side must first register a password and then notify the transmitting side of the password. Thus in a conventional facsimile a complicated task is required at both ends of the communication in order to limit the communication partner, which is a heavy burden for a user.

In addition, a facsimile limiting its communication partner as described above may exclude not only an unwanted FAX and a sales FAX but possibly useful data transmission. One who is afraid of such possibility is reluctant to use such a facsimile.

SUMMARY OF THE INVENTION

The present invention was made to solve the above described problems, and its main object is to provide a facsimile capable of acquiring a correct telephone number of a transmitting facsimile at the time of data reception.

A further object of the present invention is to provide a facsimile allowing a selection of a desired correct telephone number through simple operation by a user.

A still further object of the present invention is to provide a facsimile allo a communication only with a specific partner by a simple procedure.

In order to attain the above mentioned objects of the present invention, a facsimile in accordance with one aspect of the present invention includes a first receiving section for receiving a signal transmitted from a transmitting device, a second receiving section for receiving a telephone number of the transmitting device sent from an exchange, a memory section for storing a plurality of data concerning a communication, and a first storing section for storing in the memory section the telephone number received by the second receiving section.

Preferably, the facsimile further includes a selecting section for selecting a telephone number from the memory section and a setting section for setting the selected telephone number as a telephone number of a transmission destination.

A facsimile in accordance with another aspect of the present invention includes a first receiving section for receiving a signal transmitted from a transmitting device, a second receiving section for receiving a telephone number of the transmitting device sent from an exchange, a memory section for storing a telephone number, a comparing section for comparing the telephone number stored in the memory section and the telephone number received by the second receiving section, and a controlling section for controlling whether or not to perform an image formation, based on the signal received by,the first receiving section, when the telephone number stored in the memory section and the telephone number received by the second receiving section are the same, as the result of the comparison.

The foregoing and other objects, features, aspects and advantages of the present invention will become more apparent from the following detailed description of the present invention when taken in conjunction with the accompanying drawings.

DESCRIPTION OF THE DRAWINGS

FIG. 7 shows a specific example of a communication management record table.

FIG. 11 shows an indication on the display screen used for setting a registration in the communication management record table in accordance with a second embodiment.

DESCRIPTION OF THE PREFERRED EMBODIMENTS

First Embodiment

Figure 1:
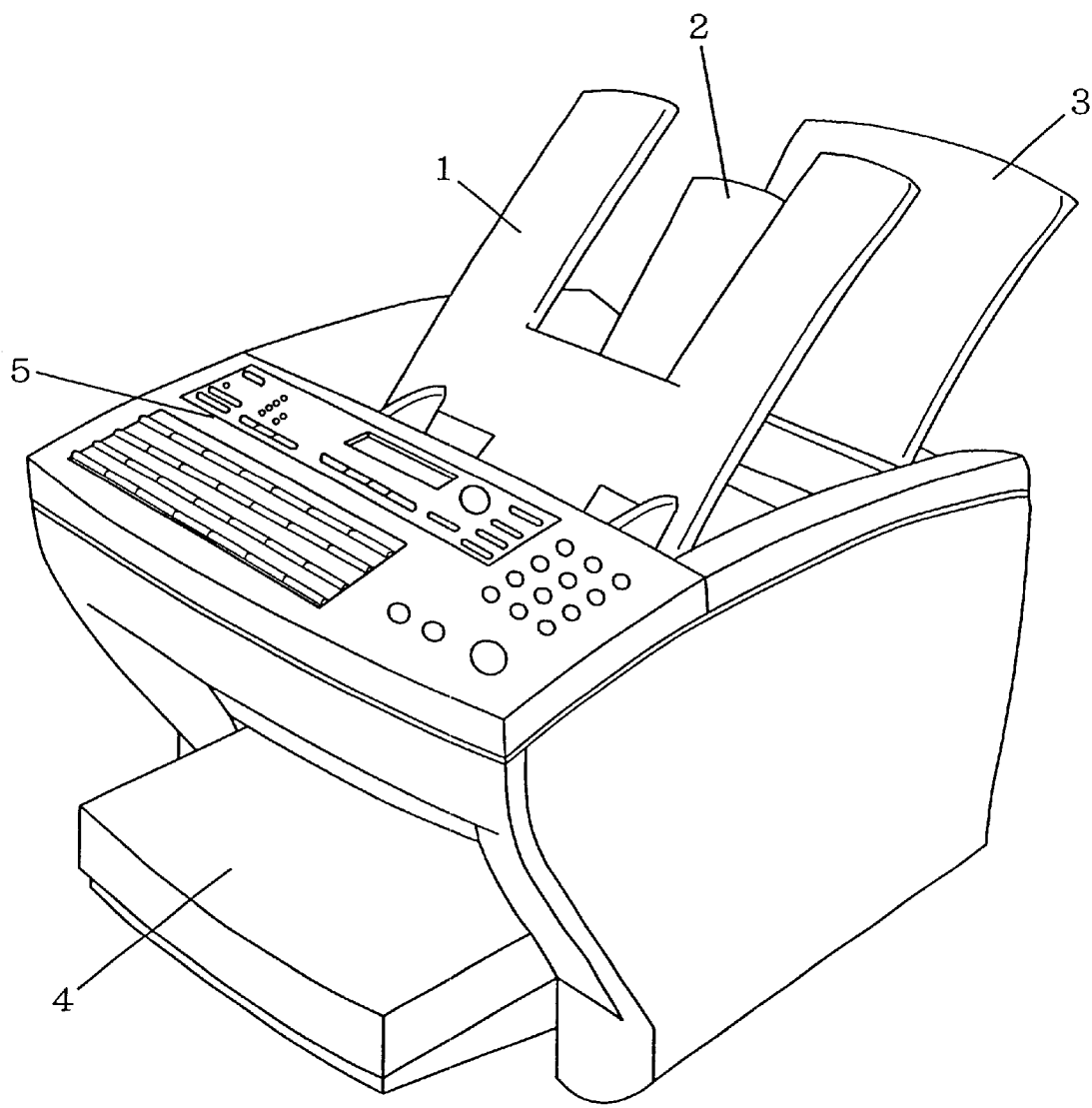
FIG. 1 is a perspective view of a facsimile in accordance with a first embodiment of the present invention.

FIG. 1 shows an appearance of the facsimile in accordance with the first embodiment of the present invention.

Referring to FIG. 1, the facsimile includes an original feed tray 1 on which an original to be transmitted is placed, an original discharge tray 2 to which a read original is to be discharged, a recorded paper discharge tray 3 to which a sheet of recording paper on which an image is printed is to be discharged, a recording paper feed tray 4 feeding a sheet of recording paper and an operation panel 5 for receiving an input by a user.

Figure 2:
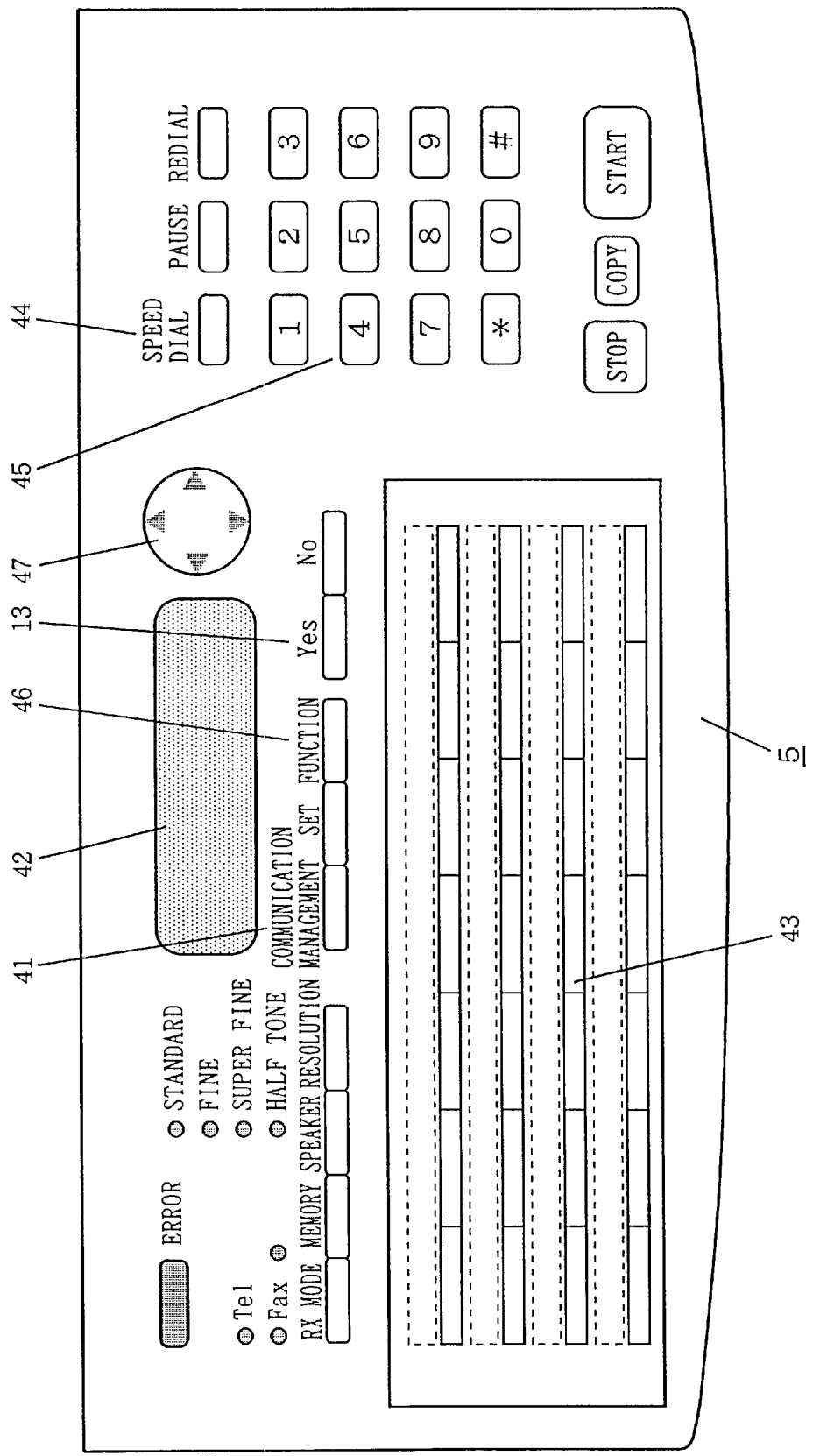
FIG. 2 is a plan view of an operation panel 5 of the facsimile of FIG. 1.

Referring to FIG. 2, operation panel 5 includes a communication management record calling key 41 for calling a result of past transmission and reception, a display screen 42, a one-touch dialing key 43 for dialing a preset destination through one key input, an abbreviated dialing key (speed dialing key) 44 for dialing a destination corresponding to a two-digit or three-digit number input from ten keys, ten keys 45 for inputting a telephone number or the like; a communication function calling key 46 for setting a communication function, and a cursor key 47.

Figure 3:
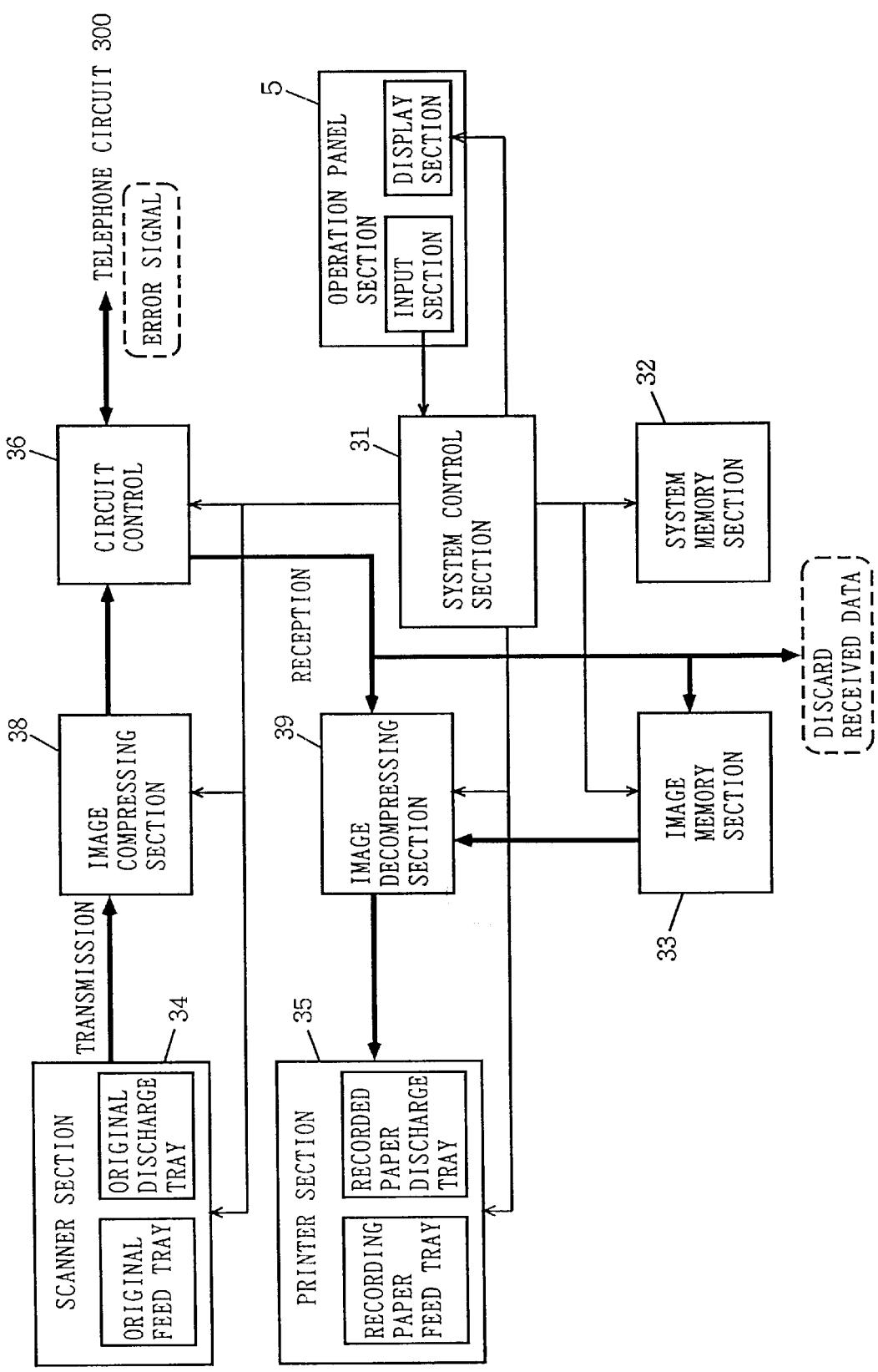
FIG. 3 is a block diagram of a control circuit of the facsimile of FIG. 1.

FIG. 3 is a block diagram showing a circuit configuration of the facsimile of FIG. 1.

Referring to FIG. 3, the facsimile includes a system control section 31 controlling the overall facsimile, a system memory section 32 recording various settings and communication management record of the facsimile, an image memory section 33 storing compressed image data, a scanner section 34 reading an original, a printer 35 printing received image data or a report, a circuit control section 36 controlling an interface with a public circuit, an image compression section 38 compressing bit map data of an original read by scanner section 34, and an image decompressing section 39 decompressing and converting to bit map data, the received image data input through circuit control section 36. Operation panel 5 is connected to system control section 31.

At the time of transmission, image data read by scanner section 34 is compressed in image compression section 38 and then transmitted to a receiving facsimile through circuit control section 36 via a telephone circuit 300.

At the time of reception, image data transmitted via telephone circuit 300 is sent to image decompressing section 39 through circuit control section 36. After being decompressed in the image decompressing section 39, image data is printed in printer section 35.

Figure 4:
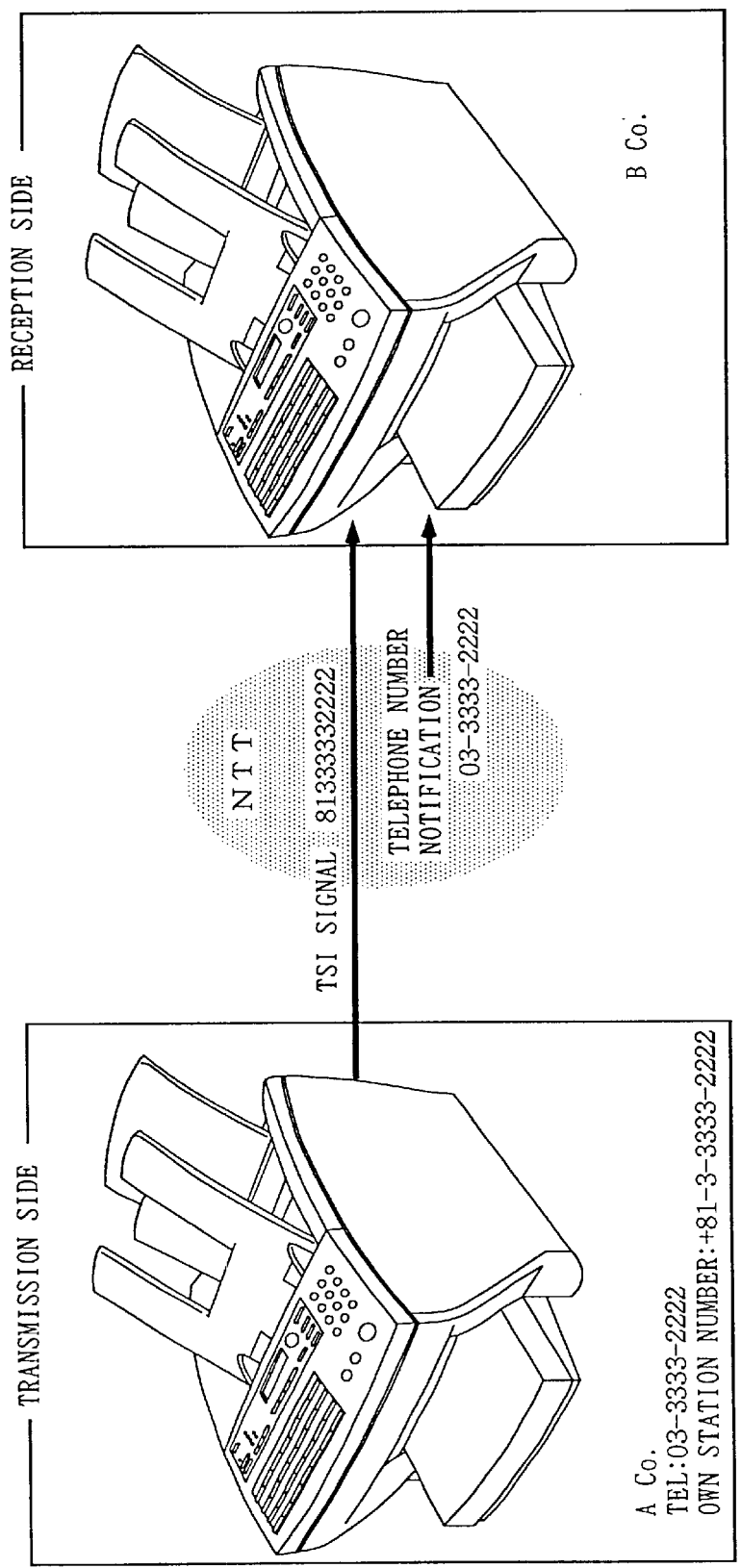
FIG. 4 illustrates a concept of a facsimile transmission in accordance with the first embodiment.

FIG. 4 illustrates a communication function of the facsimile in accordance with the embodiment.

Assume that image data is transmitted from a transmitting facsimile of A corporation to a receiving facsimile of B corporation via NTT (Nippon Telegraph And Telephone Corporation) serving as an exchange.

The telephone number (03-3333-2222) of the transmitting facsimile is sent to the receiving facsimile by the calling device telephone number notification service (number display service) of NTT. Thus the receiving facsimile can acquire the correct telephone number of the transmitting facsimile.

Although the transmitting facsimile sends its own station number (+81-3-3333-2222) as a TSI signal to the receiving facsimile, the receiving device cannot confirm whether it is the telephone number or not. Therefore, the correct number is acquired through the NTT's calling device telephone number notification service.

Figure 5:
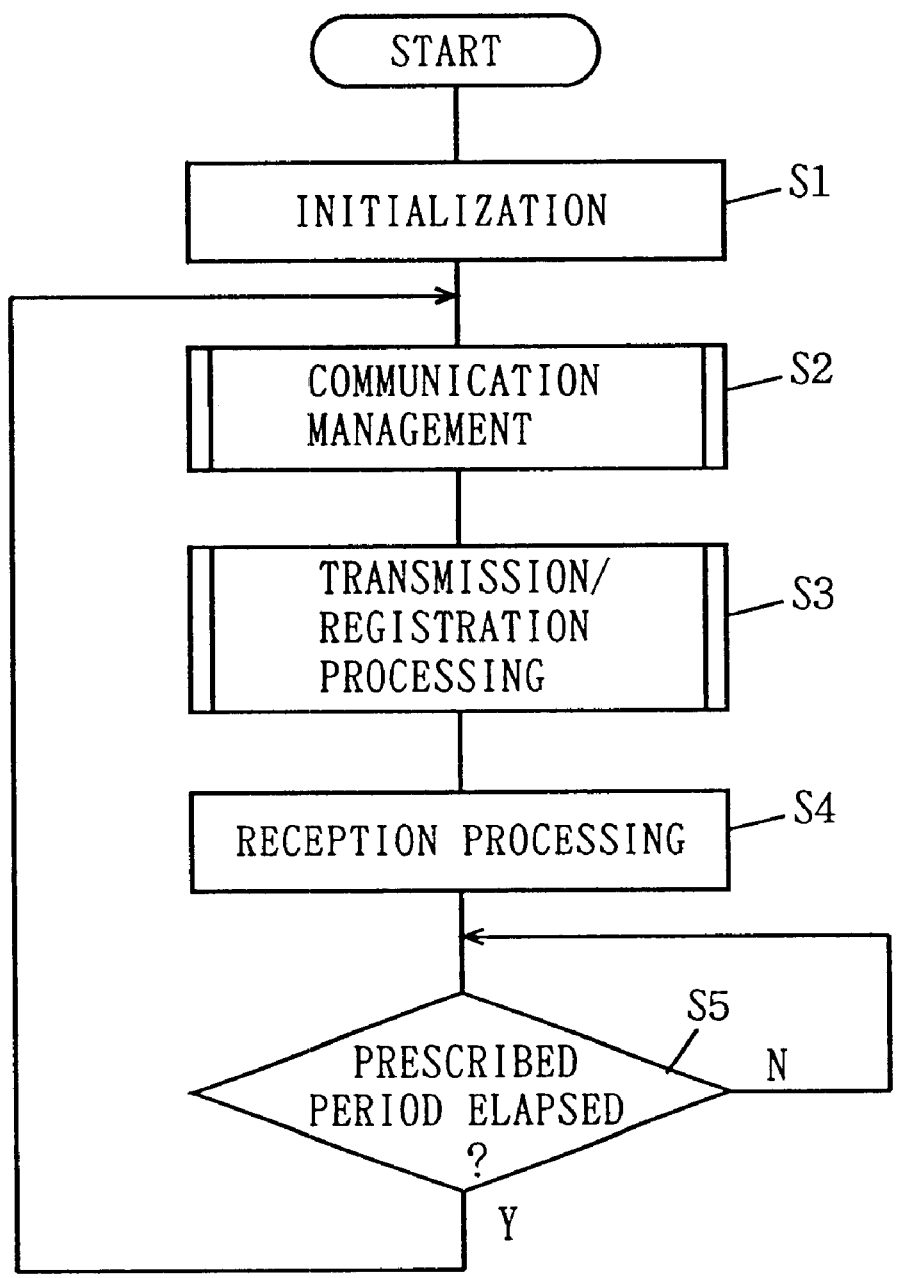
FIG. 5 is a flow chart showing a main routine in accordance with the first embodiment.

FIG. 5 is a flow chart showing a main routine of the facsimile of FIG. 1.

Referring to FIG. 5, the device is initialized in step S1 (hereinafter simply denoted by S1). In S2, the communication management is performed for the transmission and the reception. In S3, the transmission process is performed and the one-touch dialing number and the abbreviated dialing number are registered. The reception process is performed in S4. The device stands by for a prescribed period in S5. Then the flow returns to S2.

Figure 6:
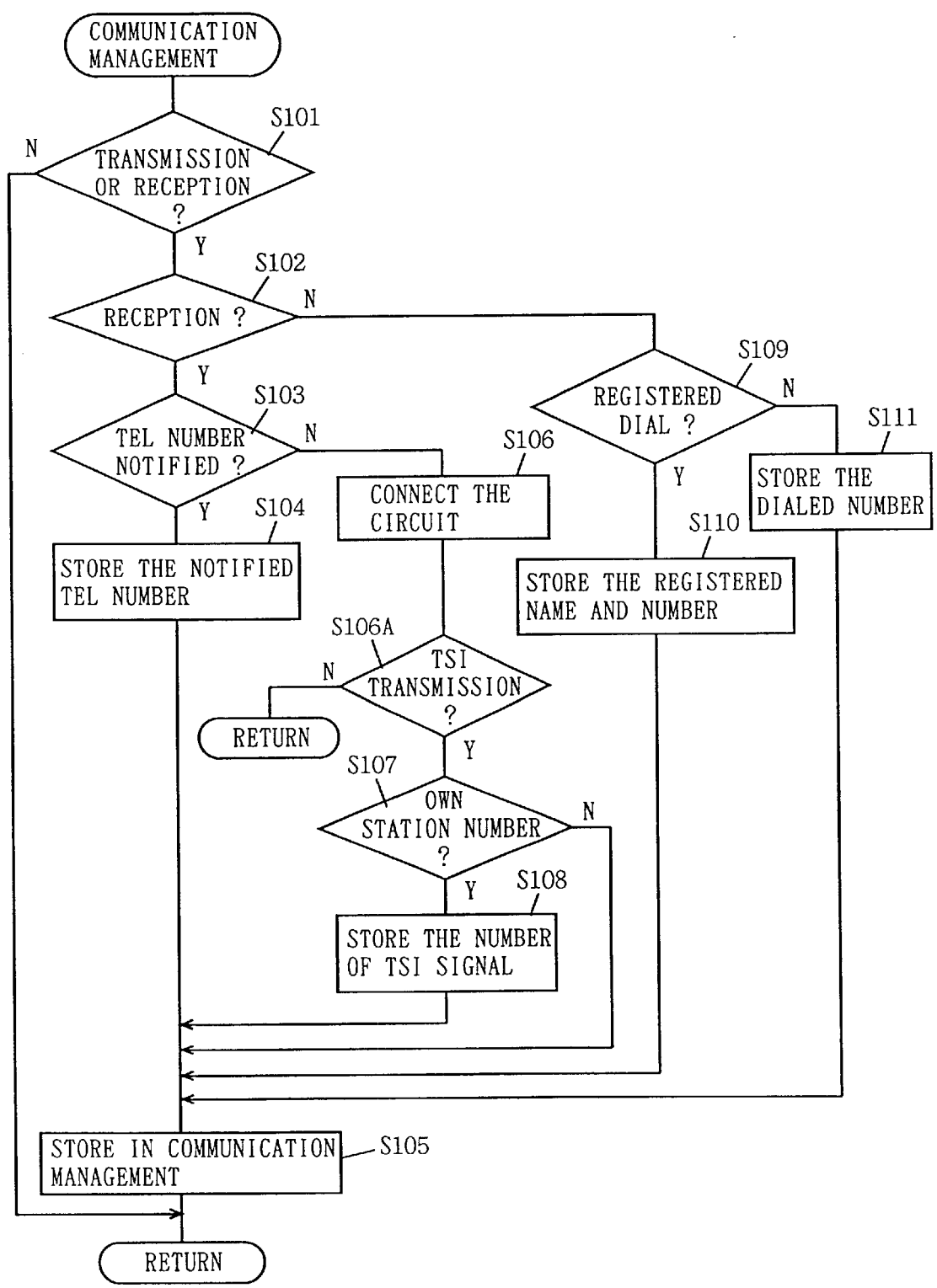
FIG. 6 is a flow chart of a communication management routine (S2) of FIG. 5.

FIG. 6 is a flow chart showing a specific process step in the communication management routine (S2) of FIG. 5.

In S101 whether or not there is a transmission or a reception is determined. If there is either a transmission or a reception, then (YES in S101), whether it is a reception or not is determined in S102. If it is a reception, then (YES in S102). In S103 whether or not there is a notification by the calling device telephone number notification service is determined. If there is a notification, then (YES in S103). The notified telephone number is stored in S104, and other information required for the communication management is recorded in the communication management record table (FIG. 7) in S105.

If there is no notification i.e. (NO in S103), the telephone circuit is connected in S106. In S106A whether to store the TSI signal to use for the transmission or not is determined. If it is not to be stored, the flow returns. If it is to be stored, in S107 whether or not there is the notification of a station number by the TSI signal from the transmitting facsimile is determined. If there is the notification i.e. (YES in S107), the number of the TSI signal is stored in S108, and then the flow proceeds to S105. The determination in S106A (whether to store and use the TSI signal for transmission) is previously set by the manipulation of the operation unit not shown (or by the mode switching through an RX mode key (FIG. 2)). This setting is stored in the system memory section, and the determination is performed in S106A in accordance therewith. A determination not to store the TSI signal prevents the storage of a wrong number as a telephone number. Further the communication using a wrong number can be prevented.

If there is not any notification from the transmitting device i.e. (NO in S107), the flow proceeds to S105 without storing a telephone number.

If the communication was not a reception i.e. (NO in S102), the flow proceeds to S109 to indicate that there is a transmission. In S109, whether or not the transmission is performed using a registered telephone number (one-touch dialing number or an abbreviated dialing number) is determined. If the registered number is used (YES in S109), the registered number and name are stored in S110. Then the flow proceeds to S105. Here, "registered number" is, e.g. "OT-13" for the 13$^{th}$ One-Touch dialing number and "SD-05" for the 5$^{th}$ "Speed-Dial", and respective corresponding telephone numbers. The registered name is a name of the transmission destination, such as "ABC Co., Ltd.", corresponding to the registered telephone number.

If the transmission is performed with a non-registered number i.e. (NO in S109) the number (dial number) input from ten keys is stored, in order to show that the transmission is performed by an input through ten keys 45, and the flow proceeds to S105.

FIG. 7 shows a configuration of the communication management record table recorded in S105 of FIG. 6.

Referring to FIG. 7, recorded in the table are communication management number, date, time, whether it is a reception or transmission, partner, whether or not the record of the partner is derived from a TSI signal and result of the communication.

In the column indicating whether it is a transmission or a reception, "RX" for the reception and "TX" for the transmission is recorded. In a partner indicating column, a telephone number notified by the calling device telephone number notification service, a number included in a TSI signal, a number registered as a one touch dialing number or an abbreviated dialing number and a corresponding name of a partner device, the telephone number input through ten keys, or "unidentified" is recorded.

In a column showing whether it is a TSI signal or not, "YES" is recorded when the record of the partner indicating column is the number of the TSI signal, and otherwise "NO" is recorded. When the communication is properly performed, "OK" is recorded in a column indicating the result of the communication, if not, "NG" is recorded.

In FIG. 7, the communication management No.1 represents the communication record stored in S104 of FIG. 6; the communication management No.2 represents the communication record stored in S108 of FIG. 6; the communication management No.3; the communication record stored in S110 of FIG. 6; the communication management No.4, represents the communication record stored in S111 of FIG. 6; and the communication management No 5 represents the communication record stored when the telephone number is not included in the TSI signal (NO in S107) in FIG. 6.

Figure 8:
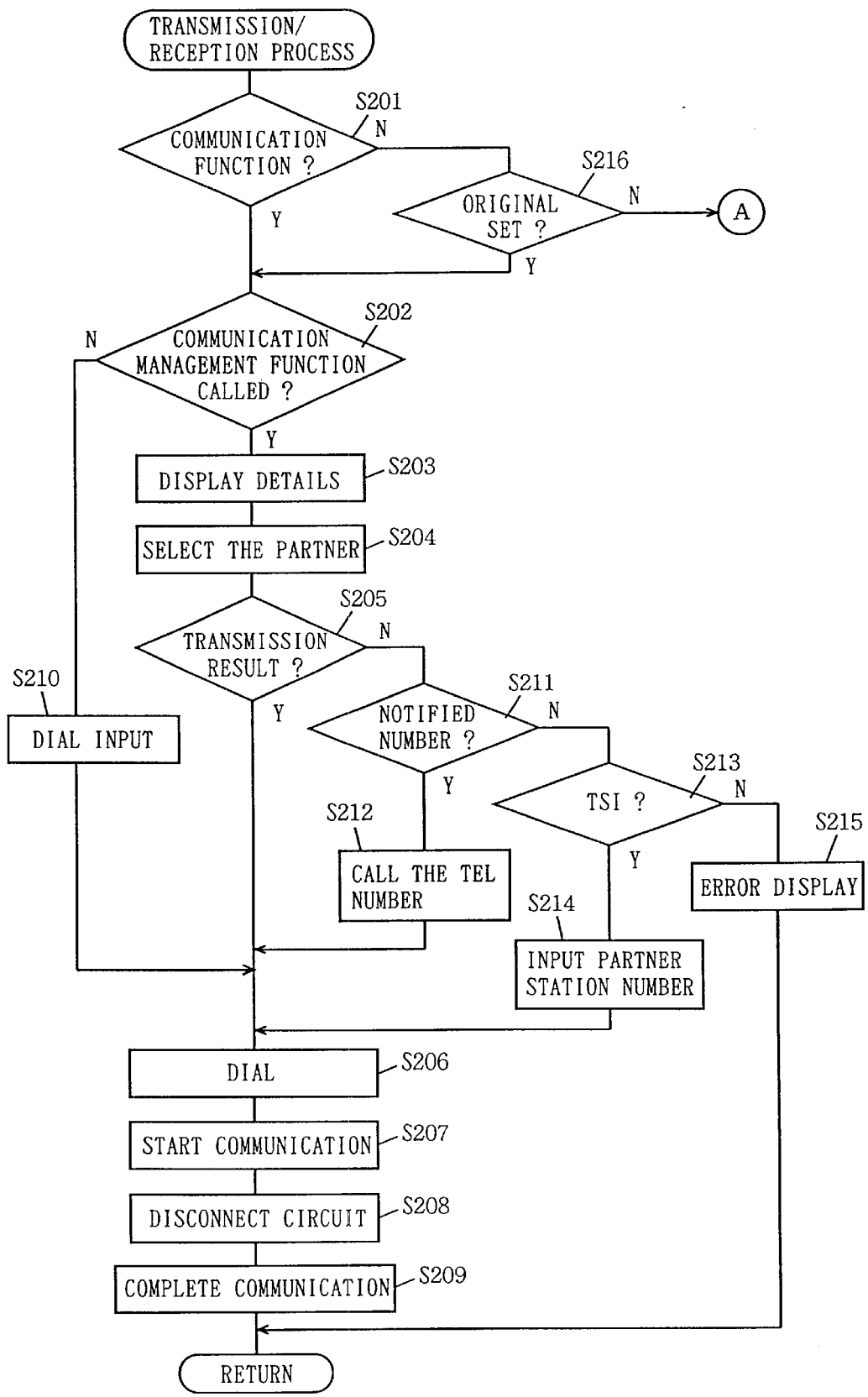
FIGS. 8 and 9 are flow charts of transmission/registration process (S3) of FIG. 5.
Figure 9:
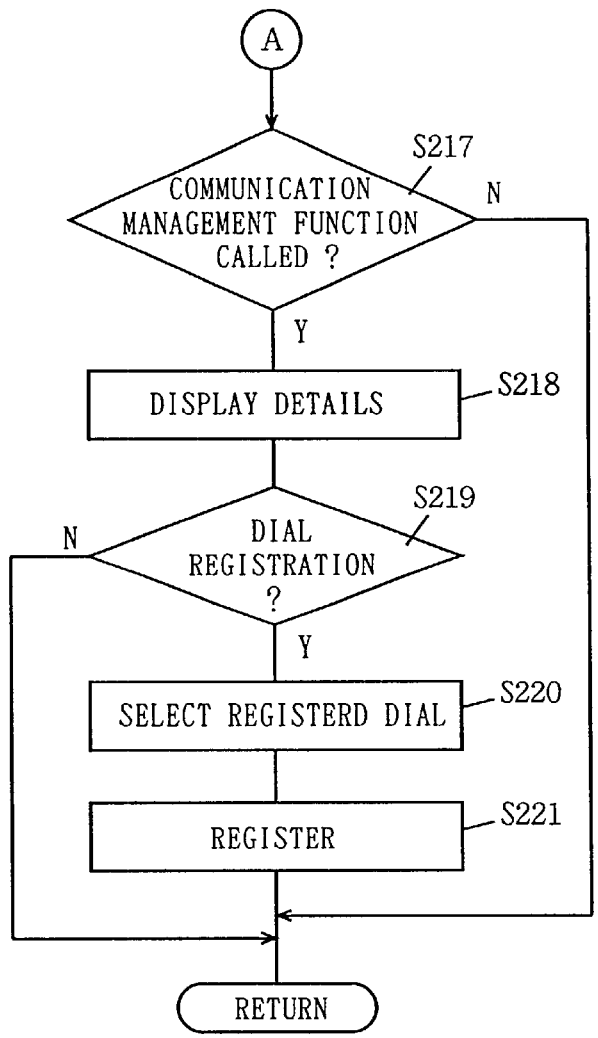

FIGS. 8 and 9 are flow charts specifically showing the transmission/registration process (S3) of FIG. 5.

Figure 10:
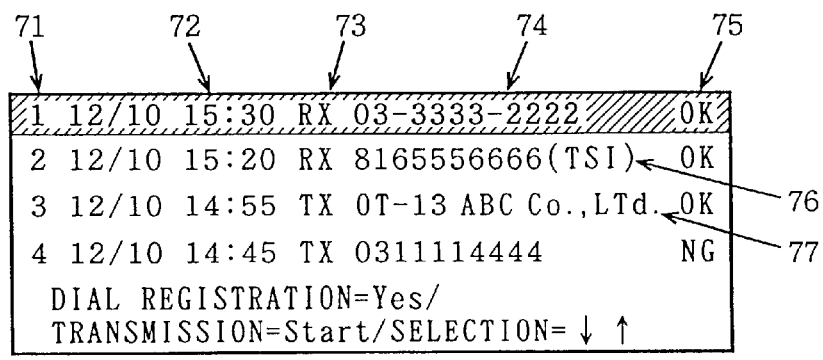
FIG. 10 shows an example of the communication management record displayed on a display screen 42.

In S201, whether the communication function (communication mode) is set by communication function calling key 46 or not is determined. If the function is set, (YES in S201). Whether the communication management record calling key 41 is pressed or not is determined in S202. If it is pressed, i.e. (YES in S202), the content of the communication management record table is displayed on display screen 42 as shown in FIG. 10. This display is based on the table shown in FIG. 7.

With reference to FIG. 10, a prescribed number of the contents of the communication management record table is displayed sequentially from the latest one. The display can be set so as to be scrolled by cursor key 47.

Information gained from the TSI signal of the partner is annexed with an indication "(TSI)" 76, so that a user can immediately know that the information is derived from the TSI signal. In addition, the user is able to know that the communication is by an abbreviated dialing number, by an abbreviated number indication 77.

In FIG. 10, reference characters 71–75 represent the communication management number, the communication time and date, the transmission (TX) or the reception (RX), the partner and the result of the communication, respectively.

The selected communication record is highlighted. A user can change the highlighted portion by moving cursor key 47. The communication partner of the selected communication record can be registered for the one-touch dialing or the abbreviated dialing by pressing a "YES" key on the operation panel. The transmission to the selected partner can be started by pressing a start key on the operation panel.

Reverting to FIG. 8, the destination is selected by a user through the manipulation of cursor key 47, the start key and so on in S204. In S205, it is determined whether the selected communication management record is the result of transmission (that is, the one with TX in the reception/transmission box). If it is, the telephone number of the destination recorded in the communication management record is immediately dialed in S206. The communication starts in S207. When the communication ends, the circuit is disconnected in S208. Thus the communication is completed in S209.

If the selected record is not the result of transmission, then (NO in S205). Whether the record selected is derived from the calling device telephone number notification service or not is determined in S211. If it is, i.e. (YES in S211), the recorded telephone number of the calling device is called from the communication management record in S212. From S206, a process to dial the telephone number starts.

If the record is determined to be not obtained from the calling device telephone number notification service i.e. (NO in S211), whether or not the selected communication management record is obtained from a TSI signal is determined in S213. If it is from a TSI signal (YES in S213), the telephone number of a destination recorded in the communication management record is called in S214. From S206 a process for dialing the telephone number thus found is initiated.

If the record is not from a TSI signal i.e. (NO in S213), screen 42 displays an error indication in S215, then the flow goes back to the main routine.

If the communication management function is not called (NO in S202), a telephone number is input by a user through ten keys 45 or using the one-touch dialing function or the abbreviated dialing function in S210. Then the flow proceeds to S206.

If the communication function is not set (NO in S201), whether an original is set on original feed tray 1 or not is determined in S216. If the original is set i.e. (YES in S216), the flow proceeds to S202.

If the original is not set i.e. (NO in S216), whether or not the communication management function is set by the communication management record calling key 41 is determined in S217 (FIG. 9). If the function is set i.e. (YES in S217), the contents of the communication management record table is displayed on display screen 42 in S218.

In S219 whether or not the dial registration is requested by a user through cursor key 47 and the YES key is determined. If the registration is requested (YES in S219), a process is carried out for selecting a location for the registration of the partner of the selected communication management record in S220 and the registration is done in S221.

When the communication management function is not called i.e. (NO in S217), or the dial registration is not requested i.e. (NO in S219), the flow returns to the main routine.

Though in the embodiment a telephone number notified by the calling device telephone number notification service is preferentially stored (S103–S108) at the reception as shown in FIG. 6, the telephone number notified by the calling device telephone number notification service and the number included in the TSI signal together may be stored. In this case, the telephone number from the calling device telephone number notification service is preferentially called by the process shown in the flow chart of FIG. 8 (S211–S214). Thus, a correct number can be dialed.

Second Embodiment

A hardware configuration of a facsimile in accordance with a second embodiment is the same with that of the first embodiment and the description thereof will not be repeated. In the second embodiment, a user can select whether to allow the recording of a number included in a TSI signal into the communication management record table or not, and further whether to allow the registration of the number in the TSI signal recorded in the communication management table as a one-touch dialing number or an abbreviated dialing number.

In addition, when the transmission utilizing the TSI signal recorded in the communication management record table fails, the number of failures is counted. When the counted value exceeds a set number, thereafter an error indication is displayed regardless of the direction of TSI signal utilized transmission, as it is very likely that a number other than a telephone number is registered as a TSI signal.

Similarly, when a TSI signal is registered as a one-touch dialing number or an abbreviated dialing number, and the transmission using this dialing number fails, the number of failures is counted. When the counted number becomes larger than a preset number, the registration will be cancelled.

In this case even though the TSI signal is cancelled from the dial registration, it still remains in the communication management table. Therefore the TSI signal can be registered again if necessary.

To be specific, at the initial setting, a display shown in FIG. 11 is displayed on display screen 42. Using this display, whether or not to record a TSI signal in the communication management record table at the reception of the TSI signal, whether or not to allow the registration of the TSI signal as a one-touch dialing number or an abbreviated dialing number when it is recorded in the communication management record table, and the retrial number (set number) allowed for the failed transmission can be set by a user by the cursor key, for example.

Next, the process in accordance with the second embodiment will be described with reference to flow charts. In the following, only the transmission process of the facsimile will be described. The reception process, characterized by the utilization of the telephone number notification service, for example, is the same with that of the first embodiment.

Figure 12:
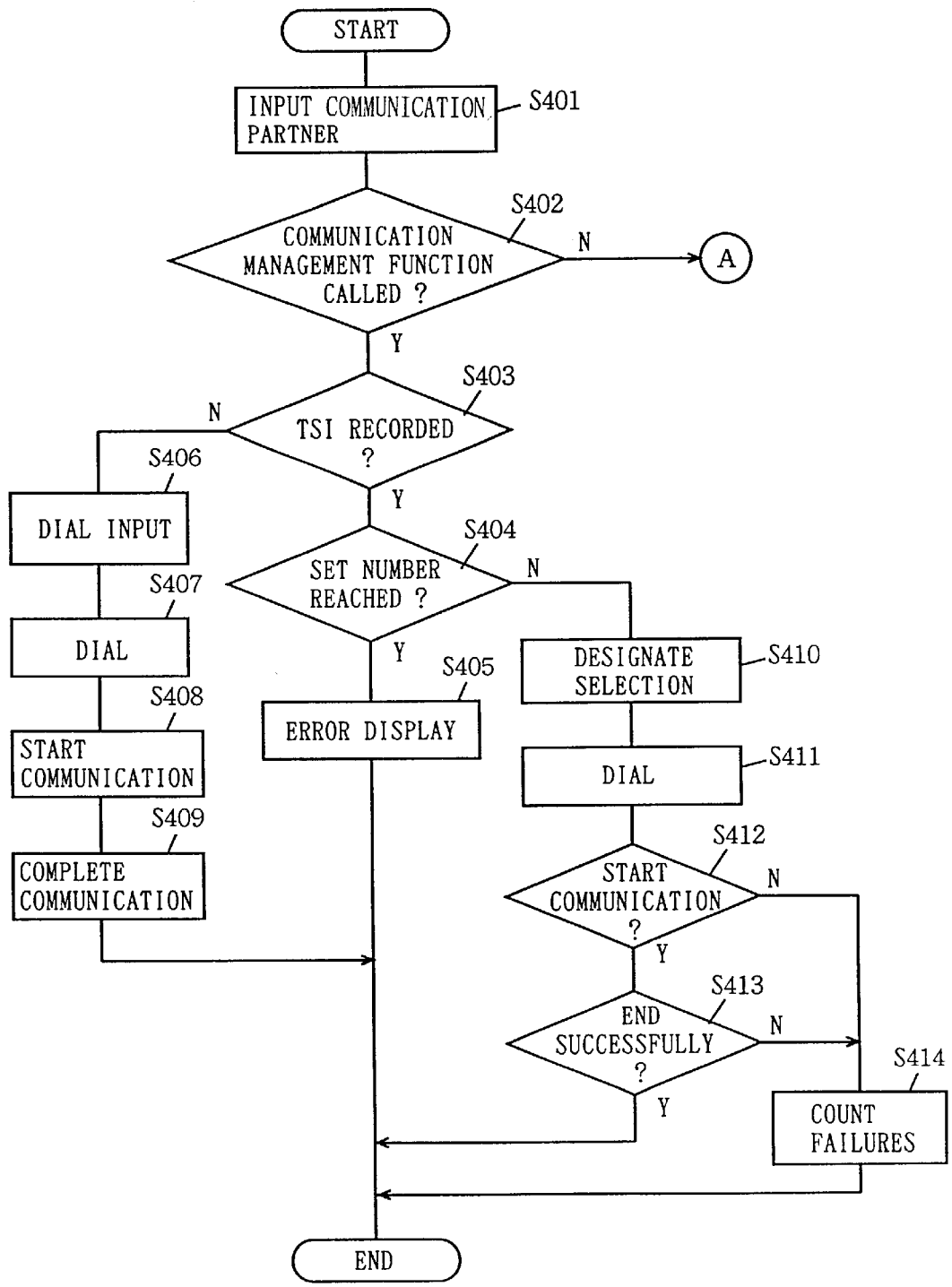
FIGS. 12 and 13 are flow charts showing a transmission process in accordance with the second embodiment.
Figure 13:
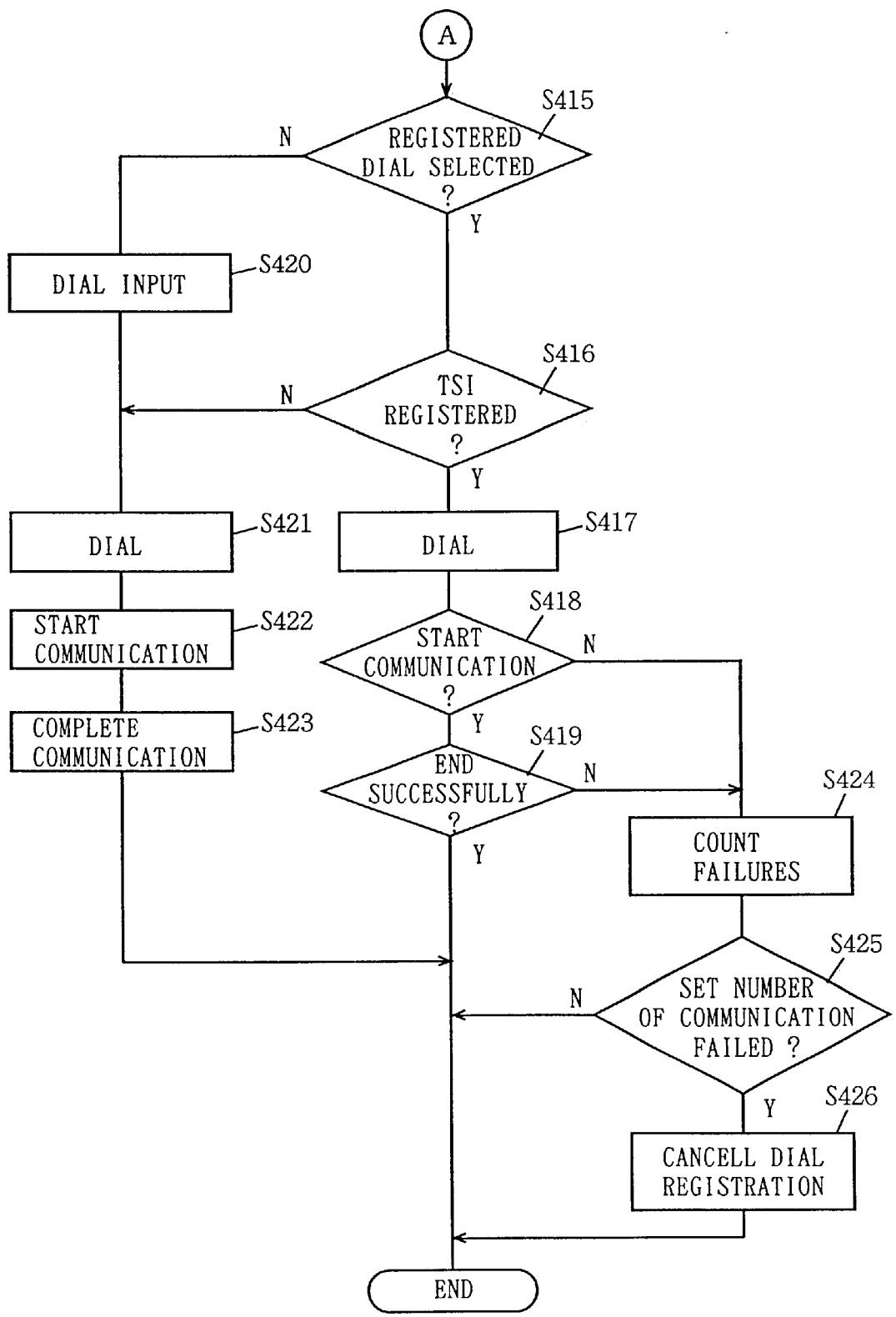

FIGS. 12 and 13 are flow charts showing the transmission process of the facsimile in accordance with the second embodiment.

Referring to FIGS. 12 and 13, in the process to input a transmission destination at the time of transmission (S401), if the communication management function is called by key 41 i.e. (YES in S402), whether a TSI signal corresponding to the selected destination is recorded or not is determined (S403). If the TSI signal is recorded i.e. (YES in S403), whether the communication failure count reaches the preset count or not is determined in S404. If the failure count reaches the preset count, an error indication is given on the display screen (S405).

If the failure count does not reach the present count i.e. (NO in S404), the destination is selected (S410) and the number is dialed (S411). Then the communication starts. If the communication is successfully completed (YES in S412 and S413), the process is terminated.

If the communication does not start properly (NO in S412) or the communication does not complete successfully (NO in S413), the transmission failure count is incremented by one (S414).

If the TSI signal corresponding to the selected destination is not recorded (NO in S403), the normal communication process sequence is performed, that is, the number to be dialed is input, the dialing is performed, the communication starts and the communication completes (S406–S409).

If the communication management function is not called in S402 i.e. (NO in S402), whether a registered number (one-touch dialing number or abbreviated dialing number) is selected or not is determined (S415). If the selected number is a registered one i.e. (YES in S415), whether the TSI signal corresponding to the number is registered or not is determined (S416). If the TSI signal is registered, the TSI signal is used for dialing (S417).

If the communication starts (YES in S418) and ends Successfully (YES in S419) then the routine will be terminated.

If the communication does not start (NO in S418) or the communication does not end successfully (NO in S419), the communication failure count is incremented (S424). When the preset number of communications fail i.e. (YES in S425), the TSI signal is cancelled from the dial registration (S426).

If the failure count does not reach the preset number (NO in S425), the present routine is terminated. If the selected number is not registered (NO in S415), the number is input through ten keys (S420) and dialed (S421), and the communication starting and completing sequence is performed (S422 and S423).

Effects of the Embodiments

The facsimile in accordance with the first embodiment has the following advantages.

The correct storage of a telephone number of a transmitting facsimile is allowed.

The desired telephone number can be correctly selected, dialed and registered through a simple operation. Therefore, the telephone number, which is frequently used only for a short time period, need not to be registered as a one-touch dialing number or an abbreviated dialing number.

The storage of a number included in a TSI signal, which is not a correct telephone number, can be prevented.

The facsimile in accordance with the second embodiment has the following advantages.

A user can choose whether to register a number included in a TSI signal or not.

The permitted number of communication retrials can be set for the failed communication in which the number included in the TSI signal is used.

In addition, when a preset number of the communications fail using a registered number, the number included in the TSI signal can be cancelled from the dial registration, whereby the registration of a wrong number can be prevented.

Third Embodiment

A hardware configuration of a facsimile in accordance with a third embodiment is almost the same with that of the first embodiment. The difference thereof is the function of communication function calling key 46 (FIG. 2) which functions as a confirm key 46 in the third embodiment.

In the third embodiment, the telephone number notified by the calling device telephone number notification service is stored in system memory section 32 (FIG. 3). When confirm key 46 is pressed, the stored telephone number will be displayed. Additionally, a user can settle the setting of the facsimile by pressing "YES" key 13 if necessary, and select the setting of the facsimile by pressing cursor key 47.

Figure 14:
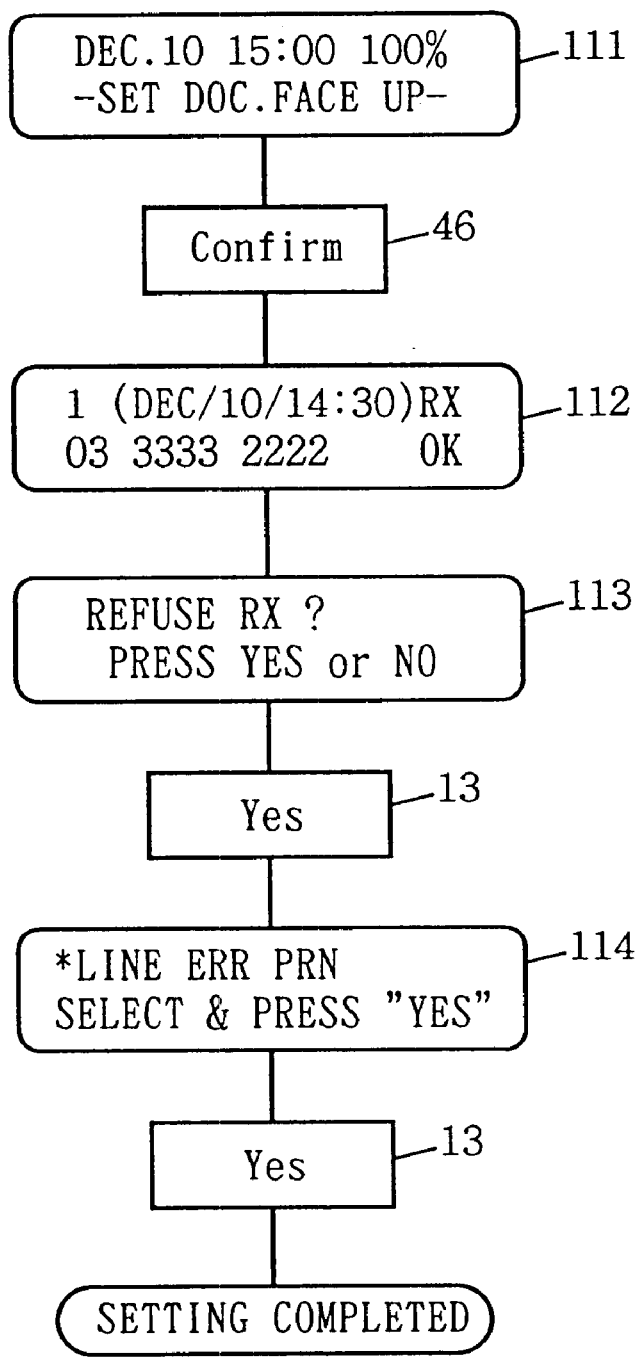
FIG. 14 illustrates a procedure to set a telephone number of a transmitting device, the data transmitted from which is to be rejected, in accordance with a third embodiment.

In the facsimile in accordance with the third embodiment, a telephone number of a calling device and, the data transmission which is to be rejected, is set as shown in FIG. 14. When the data is received from such a device, the data reception is rejected according to a procedure shown in FIG. 15.

The procedure to set the telephone number of the calling device, from which the data transmission should be rejected, is shown in FIG. 14. Here, for the rejection of data reception, the circuit connection with the calling device is rejected, an error signal is transmitted to the calling device, or received image data is discarded.

Normally, an indication 111 is given on display screen 42 of operation panel 1 (see FIG. 3). Referring to FIG. 14 in order to set the rejection of data reception, a user first presses a "Confirm" key 46. When the "Confirm" key 46 is pressed, the record of image data reception at 14:30 on Dec. 10 is displayed with the telephone number of the calling device, 03-3333-2222 as shown by an indication 112. After a few seconds, the display is switched to an indication 113 which asks the user to input whether to set the reception rejection to the telephone number 03-3333-2222.

When the user presses "YES" key 13, "LINE" indicating the rejection of circuit connection with the calling device (setting 1), "ERR" indicating the transmission of an error signal to the calling device (setting 2) and "PRN" indicating the discard of received image data (setting 3) are displayed on the screen as shown by an indication 114.

Here, an asterisk "*" is displayed on the left side of the indication "LINE" to show that the setting 1 is selected. The selection of settings 1 to 3 can be changed using cursor key 47 (see FIG. 2).

When an indication 114 is displayed on the screen, if the user presses "YES" key 13, the setting 1 is allotted for the telephone number 03-3333-2222. At the next call to the facsimile 100, if it is determined that the call is from the device with the telephone number 03-3333-2222, the connection with the calling device will be rejected.

The facsimile has the communication management function by which multiple results of data reception are stored including the telephone number of the calling device as shown by indication 112. In the facsimile, when indication ill is displayed, if the above mentioned "Confirm" key 46 is pressed for several times, the telephone numbers of the calling devices are displayed in turn on the screen 42. A user can set the rejection of the reception of the data transmitted from a calling device having a displayed number in a similar manner as described above.

Figure 15:
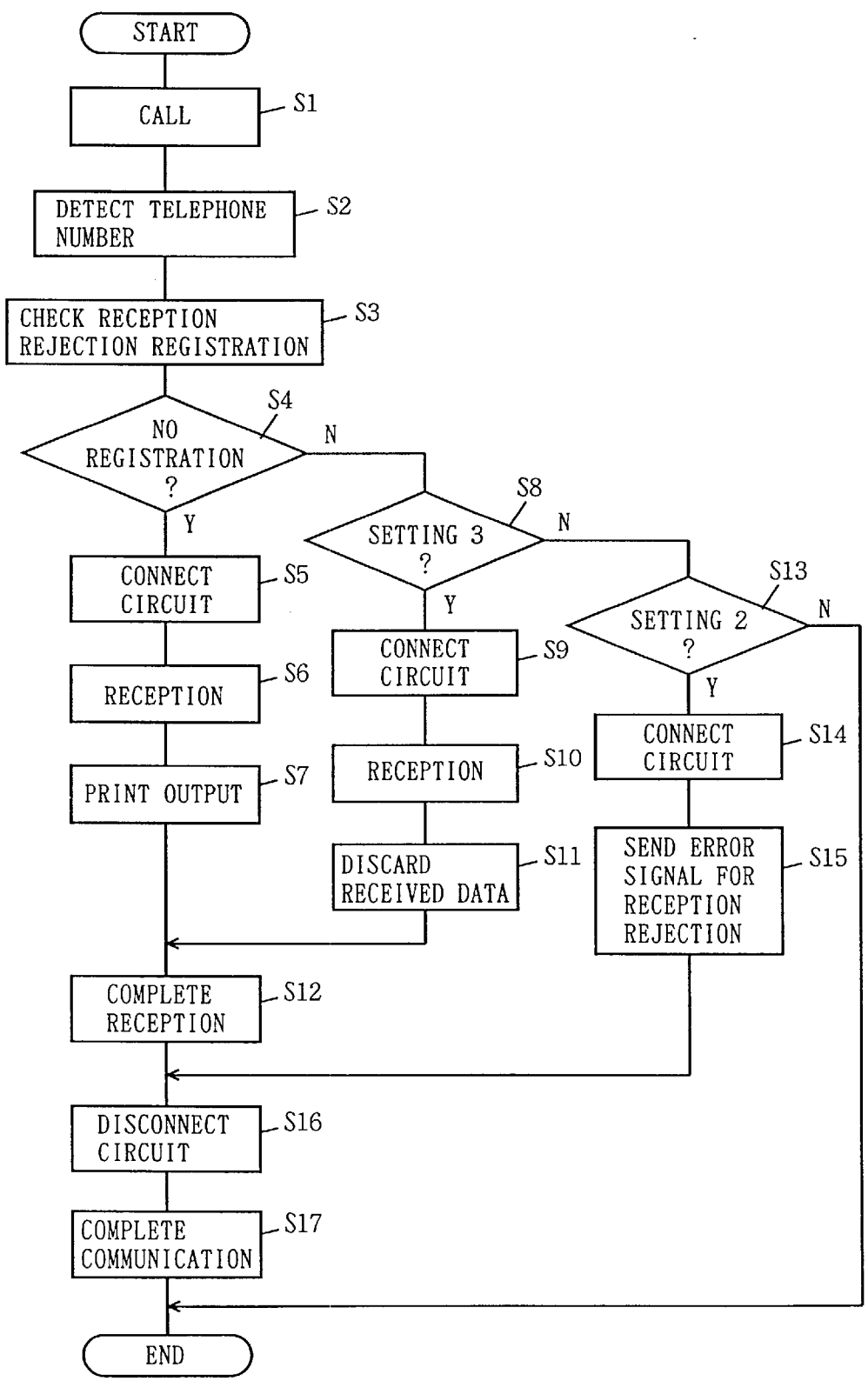
FIG. 15 is a flow chart schematically showing a process performed in a system control section 61 when data is transmitted from another facsimile.

FIG. 15 is a flow chart schematically showing the process performed in system control section 31 (see FIG. 3) when the data is transmitted from another facsimile.

In the process of reception rejection, the calling is initiated in S1. In S2, the telephone number of the calling facsimile is detected during its call. In S3, the reception rejection settings 1 to 3 are checked concerning the number detected in S2.

Next, in S4, whether the reception rejection is registered or not is determined. If the rejection is not registered i.e. (YES in S4), the telephone circuit is connected in S5 to receive an image data in S6 and to perform an output printing in S7. In S12 the reception is completed. After the process, the circuit is disconnected in S16. In S17 the communication is completed to end the present routine.

If the reception rejection is registered i.e. (NO in S4), whether the registered setting is setting 3 or not is determined in S8. If the registered setting is the setting 3 i.e. (YES in S8), the telephone circuit is connected in S9, to receive an image data in S10 and to discard the received image data in S11. Then the process proceeds to S12.

If the registered setting is not setting 3 (NO in S8), whether the registered setting is setting 2 or not is determined in S13. If the registered setting is setting 2 (YES in S13), the telephone circuit is connected in S14 to transmit an error signal indicating the reception rejection to the calling facsimile in S15. Then the flow proceeds to S16.

If the registered setting is not setting 2 (NO in S13), the registered setting is determined to be setting 1. Then the present routine is terminated without responding to the transmission from the calling facsimile.

In order to deal with an unwanted FAX or a unsolicited sales FAX, the user registers the settings for not answering the call from these devices (setting 1), for sending a signal indicating the reception rejection to these devices (setting 2), or for discarding the received image data (setting 3), and carries out the process according to these settings. Thus, the user of the facsimile does not need to undergo a complicated task on the reception side as has been conventionally required. In addition, the reception of useful data will not be excluded whereas the received useless image data will not be shown. In this manner the user can perform data transmission/reception more conveniently.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile, comprising:

a receiver which receives a facsimile signal transmitted by a calling facsimile through a telephone exchange, said facsimile signal including a telephone number of the calling facsimile which is added in the telephone exchange by a caller identification system and a TSI information set in the calling facsimile side;

a controller which gives priority to the telephone number based on the caller identification system rather than the TSI information, and a memory which stores various data including the telephone number;

wherein the controller writes the telephone number based on the caller identification system to the memory without writing the TSI information when the facsimile signal includes the telephone number based on the caller identification system.

2. A facsimile according to claim 1, wherein the controller selects a telephone number from the memory and sets the selected telephone number at a calling operation.

3. A facsimile according to claim 1, wherein the controller writes the TSI information to the memory when the facsimile signal includes no telephone numbers based on the caller identification system.

4. A facsimile, comprising:

a receiver which receives a facsimile signal transmitted by a calling facsimile through a telephone exchange, said facsimile signal including a first telephone number of the calling facsimile which is added in the telephone exchange by a caller identification system and a second telephone number set in the calling facsimile side;

a controller which gives priority to the first telephone number rather than the second telephone number, and a memory which stores various data including the telephone number;

wherein the controller writes the first telephone number without writing the second telephone number when the facsimile signal includes the first telephone number.

5. A facsimile, comprising:

a receiver which receives a facsimile signal, said facsimile signal including two kinds of telephone numbers of the calling facsimile;

a controller which gives priority to one of the telephone numbers rather than the other, and a memory which stores various data including the telephone number;

wherein the controller writes one of the telephone numbers without writing the other telephone number.

* * * * *